United States Patent
Kim et al.

(10) Patent No.: US 10,516,171 B2
(45) Date of Patent: Dec. 24, 2019

(54) CATALYST FOR FUEL CELL, ELECTRODE FOR FUEL CELL, MEMBRANE-ELECTRODE ASSEMBLY FOR FUEL CELL AND FUEL CELL SYSTEM USING THE SAME

(71) Applicant: KOLON INDUSTRIES INC, Gyeonggi-do (KR)

(72) Inventors: Hee-Tak Kim, Yongin-si (KR); Sung-Yong Cho, Yongin-si (KR); Kah-Young Song, Yongin-si (KR)

(73) Assignee: Kolon Industries, Inc., Gyeonggi-Do (KR)

(*) Notice: Subject to any disclaimer, the term of this patent is extended or adjusted under 35 U.S.C. 154(b) by 353 days.

(21) Appl. No.: 14/160,352

(22) Filed: Jan. 21, 2014

(65) Prior Publication Data

US 2014/0205922 A1 Jul. 24, 2014

Related U.S. Application Data (63) Continuation-in-part of application No. 13/951,434, filed on Jul. 25, 2013, now abandoned.

(30) Foreign Application Priority Data

Jan. 18, 2013 (KR) .................. 10-2013-0006095
Nov. 20, 2013 (KR) .................. 10-2013-0141423

(51) Int. Cl.
*H01M 4/90* (2006.01)
*H01M 8/0612* (2016.01)
*H01M 8/1004* (2016.01)

(52) U.S. Cl.
CPC ....... *H01M 4/9083* (2013.01); *H01M 8/0618* (2013.01); *H01M 8/1004* (2013.01)

(58) Field of Classification Search
None
See application file for complete search history.

(56) References Cited

U.S. PATENT DOCUMENTS 5,728,485 A 3/1998 Watanabe et al.
7,147,957 B1* 12/2006 Hitomi ............... H01M 4/8605
429/481

(Continued)

FOREIGN PATENT DOCUMENTS

JP 2004-362875 A 12/2004
JP 2006-253030 A 9/2006

(Continued)

OTHER PUBLICATIONS

Merriam Webster definition of graphitize; https://www.merriam-webster.com/dictionary/graphitize; 2009.*

(Continued)

*Primary Examiner* — Lucas J. O'Donnell
(74) *Attorney, Agent, or Firm* — Lewis Roca Rothgerber Christie LLP (57) ABSTRACT

A catalyst for a fuel cell includes an active metal catalyst and a composite supporter supporting the active metal catalyst. The composite supporter includes a spherical-shaped supporter and a fibrous supporter, wherein the fibrous supporter is included in an amount of about 5 wt % to about 40 wt % based on the total amount of the composite supporter. In addition, an electrode for a fuel cell using the same, a membrane-electrode assembly for a fuel cell including the electrode, and a fuel cell system including the membrane-electrode assembly are also disclosed.

12 Claims, 10 Drawing Sheets

(56) References Cited

U.S. PATENT DOCUMENTS

| | | |
|---|---|---|
| 7,759,019 B2 | 7/2010 | Mei et al. |
| 2003/0091891 A1 | 5/2003 | Yoshida et al. |
| 2004/0072061 A1 | 4/2004 | Nakano et al. |
| 2005/0181270 A1 | 8/2005 | Sugiura |
| 2005/0191533 A1 | 9/2005 | Kim et al. |
| 2005/0238948 A1 | 10/2005 | Mei et al. |
| 2006/0204832 A1* | 9/2006 | Mei .................. H01M 4/8605 429/483 |
| 2009/0130515 A1* | 5/2009 | Son .................. H01M 4/861 429/481 |
| 2010/0159301 A1 | 6/2010 | Tanuma |
| 2010/0310950 A1 | 12/2010 | Min et al. |
| 2011/0195339 A1 | 8/2011 | Iijima et al. |

FOREIGN PATENT DOCUMENTS

| | | |
|---|---|---|
| JP | 2009-037956 A | 2/2009 |
| JP | 2009-193910 A | 8/2009 |
| JP | 2009-266676 A | 11/2009 |
| JP | 2011-081977 A | 4/2011 |
| JP | 2011-124237 A | 6/2011 |
| KR | 10-2011-0057259 A | 5/2011 |

OTHER PUBLICATIONS

U.S. Office action dated Dec. 19, 2014, for U.S. Appl. No. 13/951,434, (13 pages).
Machine English Translation of JP 2004-362875 A, pp. 1 through 17.
Machine English Translation of JP 2009-037956 A, pp. 1 through 10.
Machine English Translation of JP 2009-193910 A, pp. 1 through 13.
Machine English Translation of JP 2009-266676 A, pp. 1 through 18.
Machine English Translation of JP 2011-081977 A, pp. 1 through 14.
EPO Search Report dated May 6, 2014, for European Patent Application No. 14150393.8, (7 pages).
SIPO Office Action dated Mar. 8, 2017, for corresponding Chinese Patent Application No. 201410003336.3 (6 pages).

* cited by examiner

CATALYST FOR FUEL CELL, ELECTRODE FOR FUEL CELL, MEMBRANE-ELECTRODE ASSEMBLY FOR FUEL CELL AND FUEL CELL SYSTEM USING THE SAME

CROSS-REFERENCE TO RELATED APPLICATIONS

This application is a continuation-in-part of U.S. patent application Ser. No. 13/951,434, filed in the United States Patent and Trademark Office on Jul. 25, 2013, which claims priority to Korean Patent Application No. 10-2013-0006095, filed in the Korean Intellectual Property Office on Jan. 18, 2013, the entire contents of all of which are incorporated herein by reference. This application also claims priority to Korean Patent Application No. 10-2013-0141423, filed in the Korean Intellectual Property Office on Nov. 20, 2013, the entire content of which is incorporated herein by reference.

BACKGROUND

1. Field

This disclosure relates to a catalyst for a fuel cell, an electrode for a fuel cell, a membrane-electrode assembly for a fuel cell, and a fuel cell system using the same.

2. Description of the Related Art

A fuel cell is a power generation system for producing electrical energy through an electrochemical redox reaction of an oxidant with a hydrogen gas or hydrogen contained in a hydrocarbon-based material such as methanol, ethanol, or a natural gas.

Such a fuel cell is a clean energy source that can replace fossil fuels. It includes a stack composed of unit cells and has an advantage of producing various ranges of power. Since it has a four to ten times higher energy density than a small lithium battery, it has been highlighted as a small portable power source.

Typical examples of the fuel cell include a polymer electrolyte membrane fuel cell (PEMFC) and a direct oxidation fuel cell (DOFC). The direct oxidation fuel cell using methanol as a fuel is called a direct methanol fuel cell (DMFC).

The direct oxidation fuel cell has lower energy density than that of the polymer electrolyte membrane fuel cell but has the advantage of easy handling of a fuel, being operated at room temperature due to its low operation temperature, and needing no additional fuel reforming processor. On the other hand, the polymer electrolyte membrane fuel cell has an advantage of high energy density and power output.

In the above-mentioned fuel cell system, the stack that substantially generates electricity includes several ones to several scores of unit cells stacked adjacent to one another, and each unit cell is formed of a membrane-electrode assembly (MEA) and a separator (also referred to as a bipolar plate). The membrane-electrode assembly is composed of an anode (also referred to as a "fuel electrode" or an "oxidation electrode") and a cathode (also referred to as an "air electrode" or a "reduction electrode"), which are separated by a polymer electrolyte membrane.

In the above-mentioned fuel cell system, a fuel is supplied to an anode and adsorbed on catalysts of the anode and then, oxidized to produce protons and electrons. The electrons are transferred into a cathode via an external circuit, and the protons are transferred into the cathode through the polymer electrolyte membrane. In addition, an oxidant is supplied to the cathode, which is reacted with the protons and the electrons on catalysts of the cathode, thereby producing electricity along with water.

However, the fuel cell has a performance deterioration problem due to elution and re-deposition of the catalysts or corrosion of a supporter supporting the catalysts.

SUMMARY

An aspect of an embodiment of the present invention is directed toward a catalyst for a fuel cell capable of suppressing structural collapse of the catalyst layer due to corrosion of a supporter and of improving cell performance.

An aspect of an embodiment is directed toward an electrode for a fuel cell using the catalyst.

An aspect of an embodiment of the present invention is directed toward a membrane-electrode assembly for a fuel cell including the electrode.

An aspect of an embodiment of the present invention is directed toward a fuel cell system including the membrane-electrode assembly.

According to one embodiment of the present invention, provided is a catalyst for a fuel cell that includes an active metal catalyst; and a composite supporter supporting the active metal catalyst and including a spherical-shaped supporter and a fibrous supporter, wherein the fibrous supporter is included in an amount of about 5 wt % to about 40 wt % based on the total amount of the composite supporter.

The fibrous supporter may be included in an amount of about 5 wt % to about 30 wt % based on the total amount of the composite supporter.

The fibrous supporter relative to the spherical-shaped supporter may have a diameter ratio ranging from about 2 to about 10.

The spherical-shaped supporter may include at least one selected from graphite and carbon black. The carbon black is selected from the group consisting of denka black, ketjen black, acetylene black, channel black, furnace black, lamp black, thermal black, and a combination thereof.

The fibrous supporter may include at least one selected from carbon nanofiber, graphitized carbon nanofiber, carbon nanotube, carbon nano-horn, and carbon nanowire.

The composite supporter may be included in an amount of about 20 wt % to about 80 wt % based on the total amount of the catalyst.

According to another embodiment of the present invention, provided is an electrode for a fuel cell including an electrode substrate; and a catalyst layer including the catalyst disposed on the electrode substrate.

The catalyst layer may further include an ionomer, and the ionomer may be included in an amount of about 15 wt % to about 50 wt % based on the total amount of the catalyst layer.

According to yet another embodiment of the present invention, provided is a membrane-electrode assembly for a fuel cell that includes a cathode; an anode facing the cathode; and a polymer electrolyte membrane interposed between the cathode and the anode. The cathode and the anode include an electrode substrate and the catalyst layer disposed on the electrode substrate, respectively.

According to still another embodiment of the present invention, provided is a fuel cell system that includes a fuel supplier for supplying a mixed fuel including a fuel and water; a reforming part for reforming the mixed fuel and generating a reformed gas including a hydrogen gas; a stack including the membrane-electrode assembly and separators disposed on any one side of the membrane-electrode assembly, and generating electrical energy through an electrochemical reaction of the reformed gas supplied from the reforming part with an oxidant; and an oxidant supplier for supplying the oxidant to the reforming part and the stack.

Other embodiments of the present invention are described in the detailed description.

The present invention may realize a fuel cell having improved performance by suppressing structural collapse of a catalyst layer for a fuel cell despite corrosion of a supporter.

DETAILED DESCRIPTION

The embodiments will be described more fully hereinafter, in which exemplary embodiments are shown. This disclosure may, however, be embodied in many different forms and is not be construed as limited to the exemplary embodiments set forth herein.

It will be understood that when an element such as a layer, film, region, or substrate is referred to as being "on" another element, it can be directly on the other element or intervening elements may also be present.

According to one embodiment, a catalyst for a fuel cell includes an active metal catalyst and a composite supporter supporting the active metal catalyst.

The composite supporter includes a spherical-shaped supporter and a fibrous supporter.

A catalyst layer includes the catalyst disposed on an electrode substrate. The catalyst layer for a fuel cell may have structural collapse due to corrosion of the supporter. Specifically, the supporter is corroded and generates carbon dioxide through an electrochemical reaction of carbon and moisture under an high voltage condition according to the following reaction scheme 1, which detaches the metal active catalyst from the supporter and thus, may not only cause loss of the catalyst but also cause structural collapse of the catalyst layer.

$$C+2H_2O \rightarrow CO_2+4H^++4e^- \qquad \text{[Reaction Scheme 1]}$$

The structural collapse of the catalyst layer may not only decrease the amount of an active catalyst but also have a compression effect on the catalyst layer and thus, deteriorate diffusion of air and a fuel and discharge of water and resultantly, decrease power output performance.

According to one embodiment, the structural collapse of a catalyst layer is suppressed by using a supporter prepared by mixing the spherical-shaped supporter and the fibrous supporter to improve durability against corrosion, since the fibrous supporter structurally supports the catalyst layer despite corrosion of the spherical-shaped supporter. In addition, a catalyst detached from the spherical-shaped supporter may be reattached to the fibrous supporter and the loss of catalyst may be avoided or reduced.

The spherical-shaped supporter may have a diameter of about 20 nm to about 100 nm, and the fibrous supporter may have a diameter of about 40 nm to 1000 nm.

According to one embodiment, the fibrous supporter may have greater than or equal to twice as large a diameter as that of the spherical-shaped supporter. According to another embodiment, the fibrous supporter relative to the spherical-shaped supporter may have a diameter ratio of about 2 to about 10 and according to yet another embodiment, about 2 to about 5. In one embodiment, when the fibrous supporter and the spherical-shaped supporter have a diameter ratio within the range, the fibrous supporter not only plays a role of a support for maintaining the pore structure of the catalyst layer despite corrosion of the spherical-shaped supporter, but an eluted catalyst is also easily re-deposited on the support.

The composite supporter may include about 60 wt % to about 95 wt % of the spherical-shaped supporter and about 5 wt % to about 40 wt % of the fibrous supporter and in one embodiment, about 70 wt % to about 95 wt % of the spherical-shaped supporter and about 5 wt % to about 30 wt % of the fibrous supporter. In one embodiment, when the fibrous supporter is included within the range, the fibrous supporter works sufficiently as a structural support and maintain the surface area of a catalyst. In one embodiment, it also improves power output performance as well as minimize loss of the catalyst. And there may not be much decrease in thickness and porosity of the catalyst layer after the cycles under a high voltage condition.

The spherical-shaped supporter may include at least one selected from graphite and carbon black (such as denka black, ketjen black, acetylene black, channel black, furnace black, lamp black, thermal black, or a combination thereof).

The fibrous supporter may include at least one selected from carbon nanofiber, a graphitized carbon nanofiber, carbon nanotube, carbon nano-horn, and carbon nano wire.

The composite supporter may be included in an amount of about 20 wt % to about 80 wt %. In one embodiment, the composite supporter may be included in an amount of about 30 wt % to about 60 wt % based on the total amount of the catalyst, for example, a sum of the catalyst and the composite supporter. In one embodiment, when the composite supporter is included within the range, the supporter has excellent durability against corrosion and suppresses structural collapse of the catalyst layer due to the corrosion.

The catalyst may be any catalyst that can be used at a fuel cell reaction. In one embodiment, the catalyst may be a metal catalyst, and in another embodiment, the catalyst may be a platinum-based catalyst.

The platinum-based catalyst may include platinum, ruthenium, osmium, a platinum-ruthenium alloy, a platinum-osmium alloy, a platinum-palladium alloy and/or a platinum-M alloy (M is at least one transition element selected from Ga, Ti, V, Cr, Mn, Fe, Co, Ni, Cu, Zn, Sn, Mo, W, Rh, and Ru).

In the fuel cell, an anode and a cathode may include the same material. However, an anode catalyst may include a platinum-ruthenium alloy as an active metal in a direct oxidation fuel cell to prevent catalyst poisoning due to carbon monoxide (CO) produced during the anode reaction.

Exemplary platinum-based catalyst may include at least one selected from Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, and Pt/Ru/Sn/W.

Figure 1:
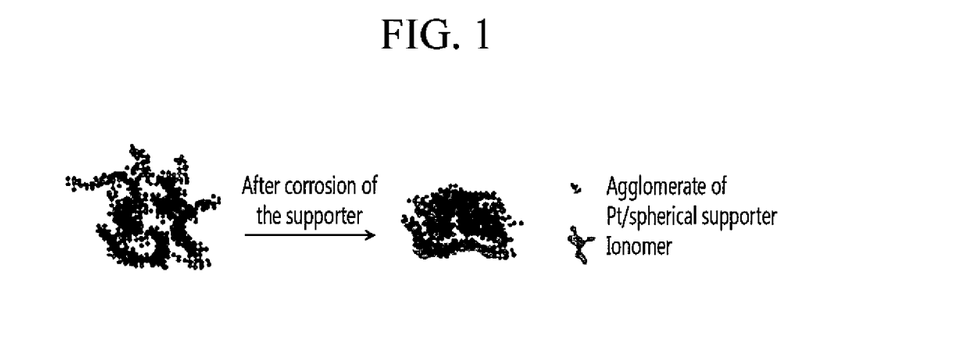
FIG. 1 is a schematic view showing the structural change of a comparable catalyst layer before and after corrosion of a supporter.
Figure 2:
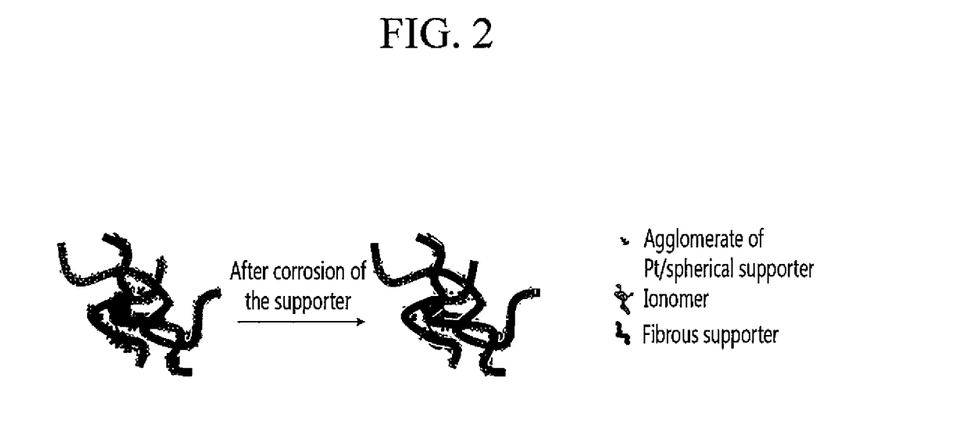
FIG. 2 is a schematic view showing the structural change of a catalyst layer according to one embodiment of the present invention before and after corrosion of a supporter.

As aforementioned, the catalyst layer according to one embodiment of the present invention may be suppressed from structural collapse despite corrosion of the supporter. FIGS. 1 and 2 schematically show the structural collapse of the catalyst layer for better understanding.

FIG. 1 is a schematic view showing the structural change of a comparable catalyst layer before and after corrosion of a supporter, while FIG. 2 is a schematic view showing the structural change of the catalyst layer according to one embodiment of the present invention before and after corrosion of the supporter.

Referring to FIGS. 1 and 2, the comparable catalyst layer has a significant structural change due to corrosion of the supporter, while the catalyst layer of one embodiment of the present invention has not much structural change despite corrosion of the supporter. The reason is that the fibrous supporter structurally works as a support and suppresses structural collapse of the catalyst layer.

According to another embodiment, an electrode for a fuel cell including the above-described catalyst layer is provided.

The electrode for a fuel cell includes an electrode substrate and a catalyst layer disposed on the electrode substrate.

The catalyst layer is the same as described above.

The catalyst layer may also include an ionomer to improve adherence of the catalyst layer and transfer property of protons.

The ionomer may be a polymer resin having proton conductivity. In one embodiment, the ionomer may be a polymer resin having a cation exchange group selected from a sulfonic acid group, a carboxylic acid group, a phosphoric acid group, a phosphonic acid group, and a derivative thereof at its side chain.

In another embodiment, the ionomer may be at least one polymer resin selected from a fluoro-based polymer, a benzimidazole-based polymer, a polyimide-based polymer, a polyetherimide-based polymer, a polyphenylenesulfide-based polymer, a polysulfone-based polymer, a polyethersulfone-based polymer, a polyetherketone-based polymer, a polyether-etherketone-based polymer, and a polyphenylquinoxaline-based polymer. In yet another embodiment, the ionomer may be at least one polymer resin selected from poly(perfluorosulfonic acid), poly(perfluorocarboxylic acid), a sulfonic acid group-containing copolymer of tetrafluoroethylene and fluorovinylether, sulfide polyetherketone, aryl ketone, poly(2,2'-m-phenylene)-5,5'-bibenzimidazole, and poly(2,5-benzimidazole).

The polymer resin having proton conductivity may include Na, K, Li, Cs, or tetrabutylammonium substituted for hydrogen (H) in a cation exchange group at the terminal end of the side chain. When the hydrogen (H) is substituted by Na in an ion exchange group at the terminal end of the side chain of the polymer resin, NaOH is used. When the hydrogen (H) is substituted with tetrabutylammonium, tetrabutylammonium hydroxide is used. K, Li, or Cs may also be substituted for the hydrogen (H) and provide appropriate compounds. A method of substituting the hydrogen (H) is known in this related art, and therefore, is not further described in detail.

The ionomer may be used singularly or in a combination. The ionomer may be used along with non-conductive compounds to improve adherence of the catalyst layer to the polymer electrolyte membrane. The non-conductive compounds may be used in an appropriate amount controlled according to their purposes.

The non-conductive compounds include at least one selected from polytetrafluoroethylene (PTFE), tetra fluoroethylene-hexafluoropropylene copolymer (FEP), tetrafluoroethylene-perfluoro alkylvinylether copolymer (PFA), ethylene/tetrafluoroethylene (ETFE), an ethylenechlorotrifluoro-ethylene copolymer (ECTFE), polyvinylidenefluoride, a polyvinylidenefluoride-hexafluoropropylene copolymer (PVdF-HFP), dodecylbenzenesulfonic acid, and sorbitol.

The ionomer may be included in an amount of, in one embodiment, about 15 wt % to about 50 wt %, in another embodiment, about 20 wt % to about 40 wt % based on the total amount of the catalyst layer. In one embodiment, when the ionomer is included within the range, adherence of the catalyst layer and transportation of protons are improved.

The electrode substrate plays a role of supporting an electrode and diffusing a fuel and an oxidant into the catalyst layer, so that the fuel and the oxidant can easily approach the catalyst layer.

The electrode substrate may be a conductive substrate such as carbon paper, carbon cloth, carbon felt, or a metal cloth (a porous film made of metal fiber or a metal film disposed on the surface of a cloth made of a polymer fiber). The electrode substrate is not limited thereto.

The electrode substrate may undergo a water-repellent-treatment with a fluorinated resin to prevent deterioration of diffusion efficiency of a reactant due to water generated during operation of a fuel cell.

The fluorinated resin may include polytetrafluoroethylene, polyvinylidene fluoride, polyhexafluoropropylene, polyperfluoroalkylvinylether, polyperfluorosulfonylfluoride alkoxyvinyl ether, fluorinated ethylene propylene, polychlorotrifluoroethylene, or a copolymer thereof.

The electrode for a fuel cell may further include a microporous layer to increase diffusion effects of a reactant in the electrode substrate as well as in the electrode substrate and the catalyst layer.

The microporous layer generally includes conductive powders with a particular particle diameter, for example, carbon powder, carbon black, acetylene black, activated carbon, carbon fiber, fullerene, carbon nanotube, carbon nanowire, carbon nano-horn, or carbon nano ring.

According to another embodiment, a membrane-electrode assembly for a fuel cell including the above described electrode is provided.

Figure 3:
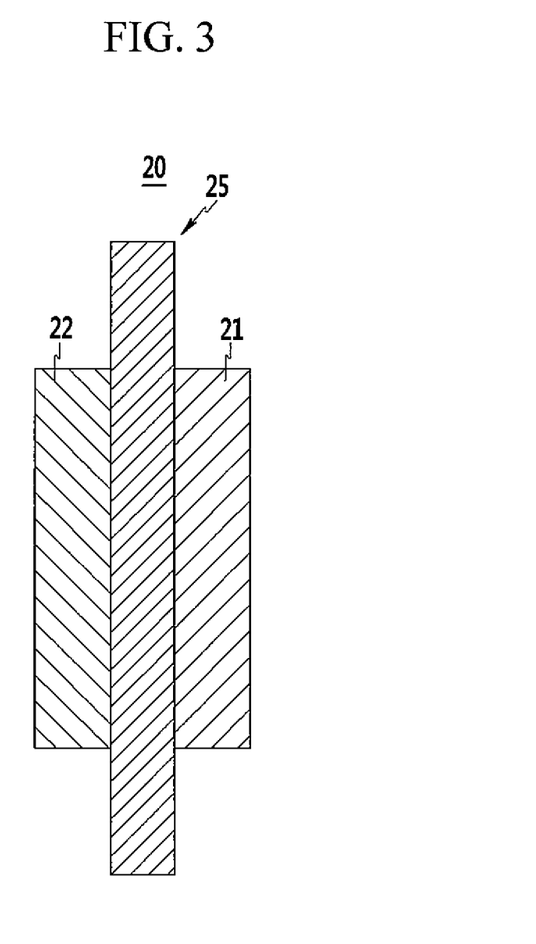
FIG. 3 is a schematic view showing a membrane-electrode assembly (MEA) for a fuel cell according to one embodiment.

The membrane-electrode assembly for a fuel cell is described referring to FIG. 3.

FIG. 3 is a schematic view showing the membrane-electrode assembly (MEA) according to one embodiment.

Referring to FIG. 3, the membrane-electrode assembly 20 includes a polymer electrolyte membrane 25, a cathode 21, and an anode 22. Here, the polymer electrolyte membrane 25 is between the cathode 21 and the anode 22.

At least either one of the cathode 21 and the anode 22 is the electrode for a fuel cell described above.

The polymer electrolyte membrane 25 may be a solid polymer electrolyte having a thickness of about 10 μm to about 200 μm and act as an ion exchanger for transferring protons produced from the catalyst layer of the anode to the catalyst layer of the cathode.

The polymer electrolyte membrane 25 may be any polymer electrolyte membrane made of any polymer resin having proton conductivity that is used for a polymer electrolyte membrane of a fuel cell. The polymer resin may be a polymer resin having at least one cation exchange group selected from a sulfonic acid group, a carboxylic acid group, a phosphoric acid group, a phosphonic acid group, and a derivative thereof at its side chain.

Examples of the polymer resin may include at least one selected from a fluoro-based polymer, a benzimidazole-based polymer, a polyimide-based polymer, a polyetherimide-based polymer, a polyphenylenesulfide-based polymer, a polysulfone-based polymer, a polyethersulfone-based polymer, a polyetherketone-based polymer, a polyether-etherketone-based polymer, and a polyphenylquinoxaline-based polymer; and more specific examples of the polymer resin may include poly(perfluorosulfonic acid) (commercially available as NAFION®, and NAFION® is a registered trademark of E.I. Du Pont De Nemours and Company, Wilmington, Del.), poly(perfluorocarboxylic acid), a sulfonic acid group-containing copolymer of tetrafluoroethylene and fluorovinylether, polyetherketone sulfide, aryl ketone, poly(2,2'-(m-phenylene)-5,5'-bibenzimidazole, and poly(2,5-benzimidazole).

According to another embodiment, a fuel cell system including the above described membrane-electrode assembly is provided.

Figure 4:
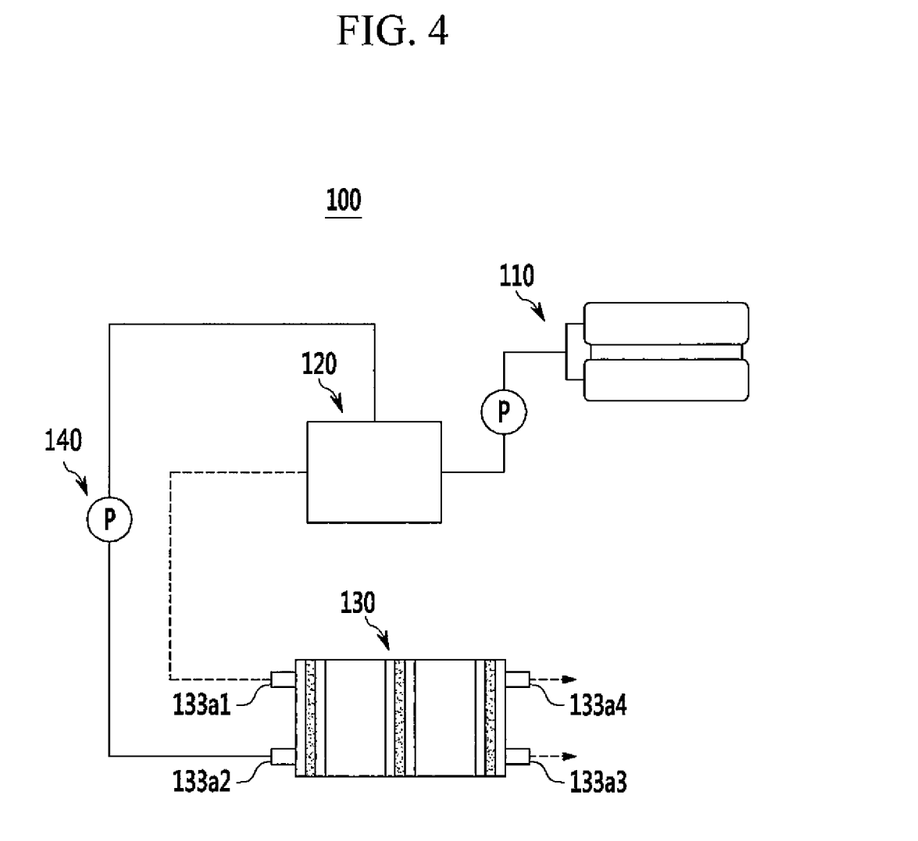
FIG. 4 is a schematic view showing the structure of a fuel cell system according to one embodiment of the present invention.
Figure 5:
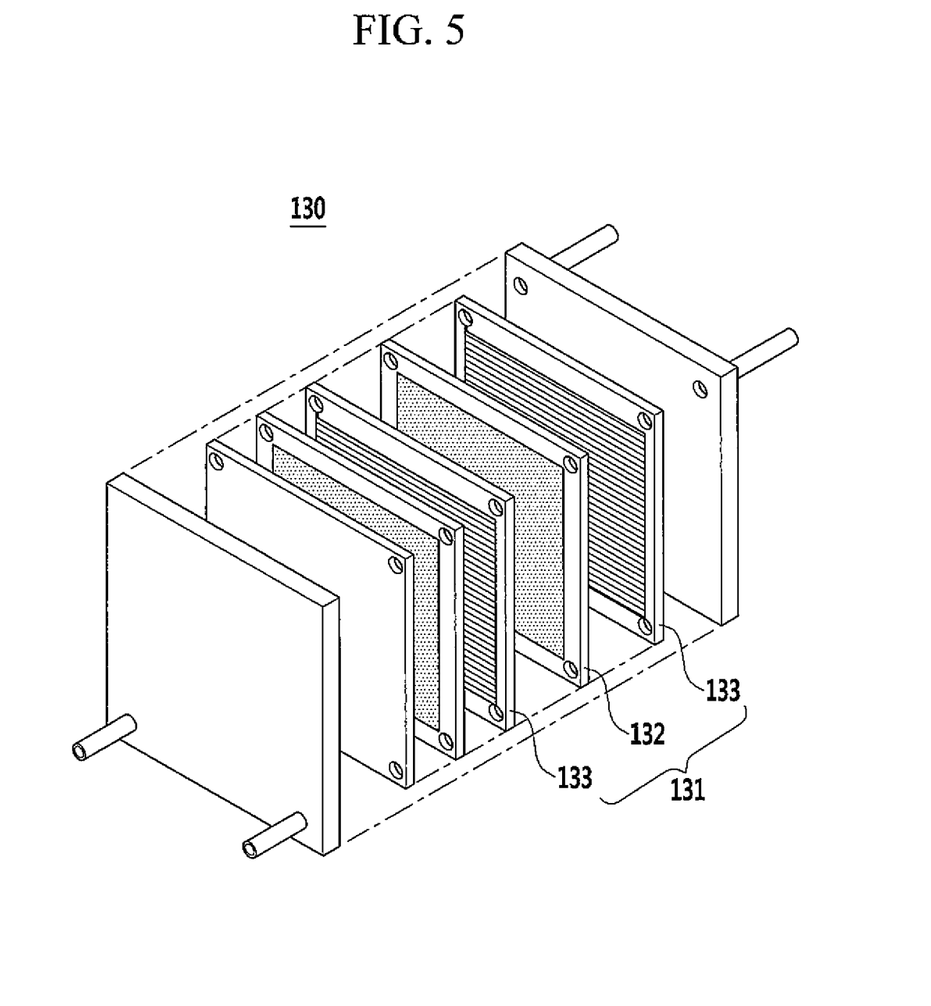
FIG. 5 is the exploded perspective view of a stack of a fuel cell system according to one embodiment.

The fuel cell system is described referring to FIGS. 4 and 5. FIGS. 4 and 5 show one example of the fuel cell system, but the present invention is not limited thereto.

FIG. 4 is a schematic view showing the structure of the fuel cell system according to one embodiment of the present invention, and FIG. 5 is an exploded perspective view describing the stack of the fuel cell system in accordance with one embodiment of the present invention.

Referring to FIGS. 4 and 5, a fuel cell system 100 according to one embodiment includes a fuel supplier 110 for supplying a mixed fuel of fuel and water, a reforming part 120 for reforming the mixed fuel and generating a reformed gas including a hydrogen gas; a stack 130 (including the membrane-electrode assembly and separators disposed on both sides of the membrane-electrode assembly) for generating electrical energy through electrochemical reaction of the reformed gas supplied from the reforming part, and an oxidant; and an oxidant supplier 140 for supplying the oxidant to the reforming part 120 and the stack 130.

The stack 130 includes a plurality of unit cells 131 which induce an oxidation/reduction reaction between the reformed gas including hydrogen gas supplied from the reforming part 120 and the oxidant supplied from the oxidant supplier 140 to generate electric energy.

Each unit cell 131 serves as a unit for generating electricity and includes a membrane-electrode assembly 132 which oxidizes and reduces the reformed gas including hydrogen gas and oxygen in the oxidant, and separators 133 (also referred to as bipolar plate) which supply the reformed gas and the oxidant to the membrane-electrode assembly 132. The separators 133 are arranged on both side of the membrane-electrode assembly 132. Herein, the separators that are respectively located at the most exterior sides of the stack are referred to as end plates 133a.

Moreover, the end plate 133a of the separators includes a first supply tube 133a1 having a pipe shape for injecting the reformed gas supplied from the reforming part 120, and a second supply tube 133a2 having a pipe shape for injecting the oxidant. The other end plate 133a includes a first discharge tube 133a3 for discharging the remaining reformed gas that does not finally react in the plurality of unit cells 131, to the outside, and a second discharge tube 133a4 for discharging the remaining oxidant that does not react finally in the plurality of unit cells 131, to the outside.

The following examples illustrate the present invention in more detail. However, it is understood that the present invention is not limited by these examples.

(Manufacture of Membrane-Electrode Assembly)

Example 1

A catalyst layer composition was prepared as follows: a composite supporter including 95 wt % of ketjen black with a diameter of 20 nm as a spherical-shaped supporter and 5 wt % of graphitized carbon nanofiber with a diameter of 100 nm as a fibrous supporter was prepared, 32 wt % of a platinum catalyst was supported on 33 wt % of the composite supporter, and 35 wt % of NAFION® (DuPont Chemicals Co., Ltd.) as ionomer was added thereto.

The catalyst layer composition was coated on a FEP (fluorinated ethylene propylene) film and sufficiently dried at 90° C. in an oven for 5 hours to form a catalyst layer. The catalyst layer is used as a cathode catalyst layer in a cathode and an anode catalyst layer in an anode.

The cathode and anode catalyst layers were transferred on a fluorine-based film and removed the FEP film therefrom, fabricating a membrane-catalyst layer assembly. The membrane-catalyst layer assembly was used with a 35BC diffusion layer (SGL Group), fabricating a membrane-electrode assembly.

Example 2

A membrane-electrode assembly for a fuel cell was fabricated according to the same method as Example 1 except for using a composite supporter including 85 wt % of ketjen black and 15 wt % of graphitized carbon nanofiber in Example 1.

Example 3

A membrane-electrode assembly for a fuel cell was fabricated according to the same method as Example 1 except for using a composite supporter including 70 wt % of ketjen black and 30 wt % of graphitized carbon nanofiber in Example 1.

Example 4

A membrane-electrode assembly for a fuel cell was fabricated according to the same method as Example 1 except for using a composite supporter including 95 wt % of ketjen black having a diameter of 20 nm and 5 wt % of graphitized carbon nanofiber having a diameter of 50 nm in Example 1.

Example 5

A membrane-electrode assembly for a fuel cell was fabricated according to the same method as Example 1 except for using a composite supporter including 95 wt % of ketjen black having a diameter of 20 nm and 5 wt % of graphitized carbon nanofiber having a diameter of 200 nm in Example 1.

Comparative Example 1

A membrane-electrode assembly for a fuel cell was fabricated according to the same method as Example 1 except that a catalyst layer composition was prepared by supporting 32 wt % of a platinum catalyst on 33 wt % of ketjen black having a diameter of 20 nm and adding 35 wt % of NAFION® (DuPont Chemistry Co., Ltd.) as ionomer thereto.

Comparative Example 2

A membrane-electrode assembly for a fuel cell was fabricated according to the same method as Example 1 except for using a composite supporter including 50 wt % of ketjen black and 50 wt % of graphitized carbon nanofiber in Example 1.

Comparative Example 3

A membrane-electrode assembly for a fuel cell was fabricated according to the same method as Example 1 except for using a composite supporter including 98 wt % of ketjen black and 2 wt % of graphitized carbon nanofiber in Example 1.

Comparative Example 4

A membrane-electrode assembly for a fuel cell was fabricated according to the same method as Example 1 except for using a composite supporter including 55 wt % of ketjen black and 45 wt % of graphitized carbon nanofiber in Example 1.

Evaluation 1: Structural Change of Catalyst Layer

The membrane-electrode assemblies according to Example 2 and Comparative Example 1 were cycled by repetitively applying with a voltage of 0.6 V to 1.0 V at 80° C. after providing each cathode with $O_2$ with a relative humidity of 100%, and each anode with $H_2$ with a relative humidity of 100%.

The catalyst layers according to Example 2 and Comparative Example 1 were examined regarding the cross-section using a scanning electron microscope (SEM) before the cycle, that is, before corrosion of the supporter, and after the cycle, that is, after the corrosion of the supporter. The results are provided in FIGS. 6A, 6B, 7A, and 7B.

Figure 6A:
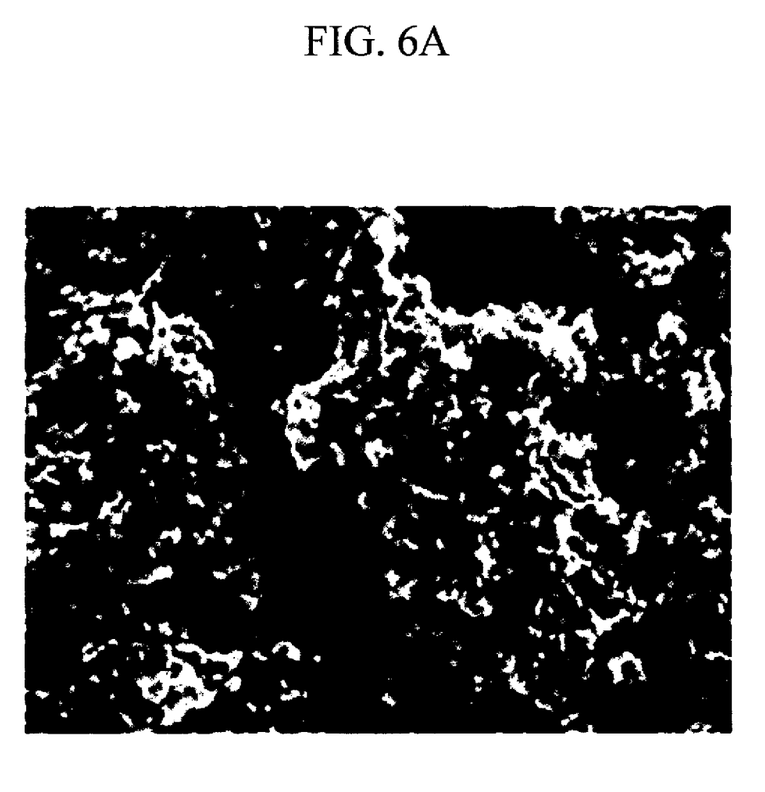
FIGS. 6A and 6B are scanning electron microscope photographs respectively showing the surface of a catalyst layer for a fuel cell according to Example 2 before and after corrosion of a supporter.
Figure 6B:
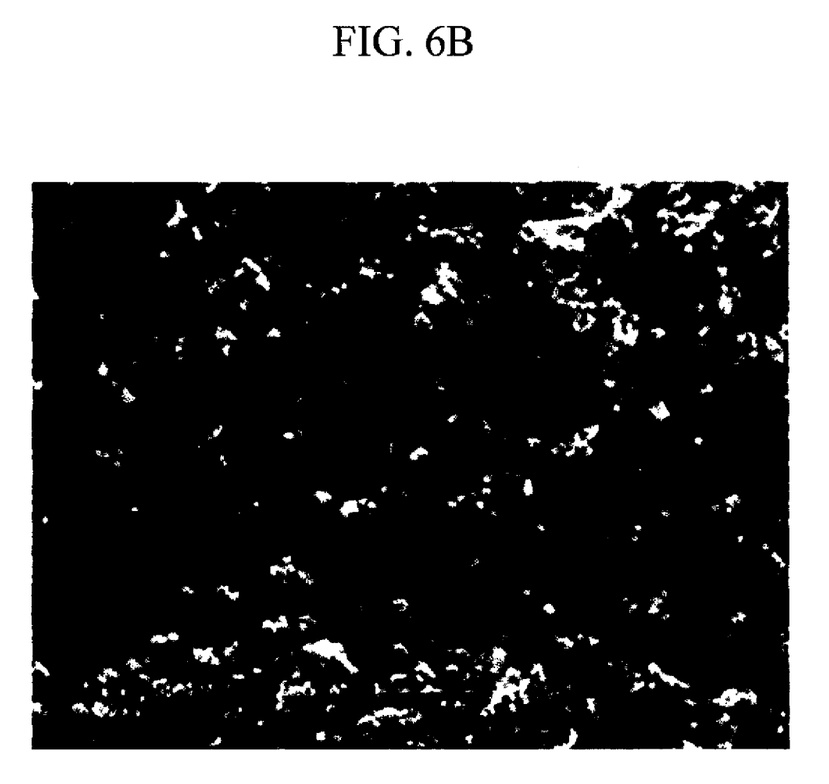
Figure 7A:
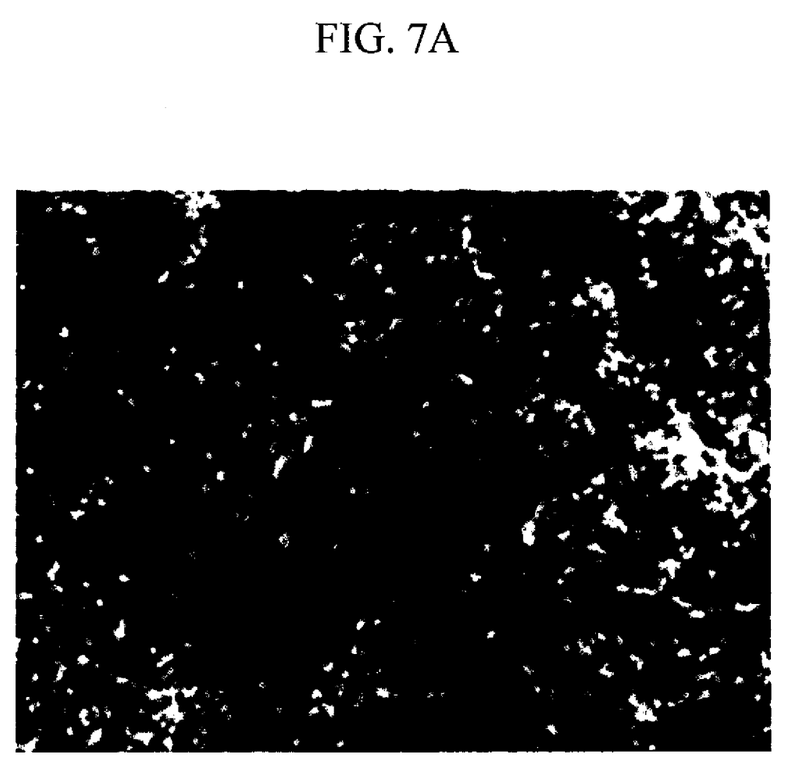
FIGS. 7A and 7B are scanning electron microscope photographs respectively showing the surface of a catalyst layer for a fuel cell according to Comparative Example 1 before and after corrosion of a supporter.
Figure 7B:
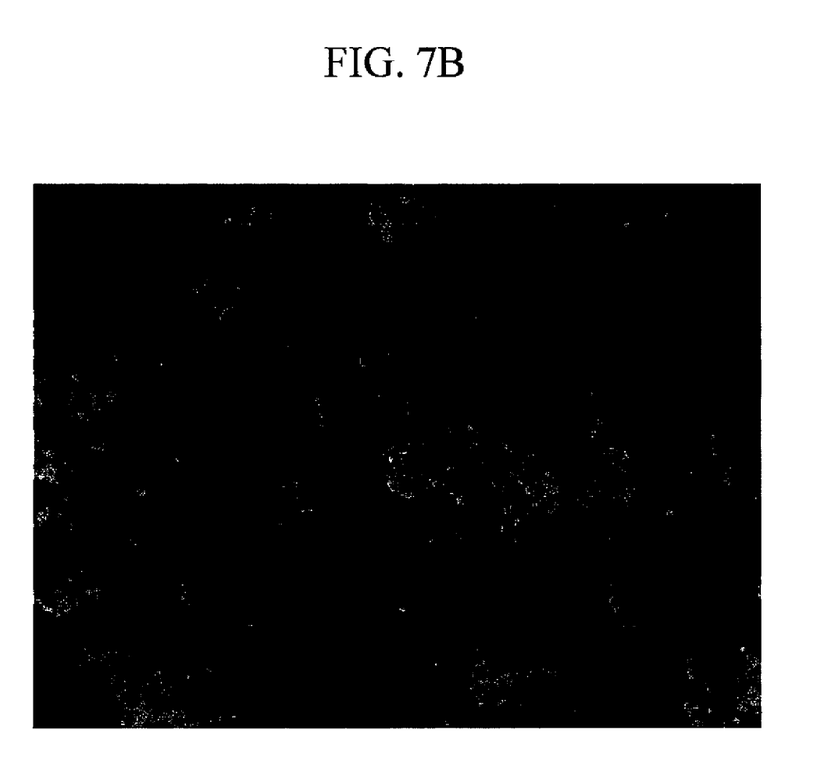

FIGS. 6A and 6B are respectively the scanning electron microscope photographs of the supporter before and after the corrosion in the catalyst layer for a fuel cell surface according to Example 2. FIGS. 7A and 7B are respectively the scanning electron microscope photographs of the supporter before and after the corrosion in the catalyst layer for a fuel cell surface according to Comparative Example 1.

Referring to FIGS. 6A to 7B, the structure of the catalyst layer for a fuel cell according to Example 2 was not changed much despite the corrosion of the supporter, while the structure of the catalyst layer for a fuel cell according to Comparative Example 1 was dramatically changed. Accordingly, the catalyst layer for a fuel cell according to one embodiment was suppressed from structural collapse.

Evaluation 2: Durability of Catalyst Layer

The membrane-electrode assemblies according to Example 2 and Comparative Example 1 were cycled by repetitively applying with a voltage in a range of 0.6 V to 1.0 V by linearly changing the voltage within the range at 80° C. after providing each cathode with $O_2$ with a relative humidity of 100% and each anode with $H_2$ with a relative humidity of 100%.

Figure 8:
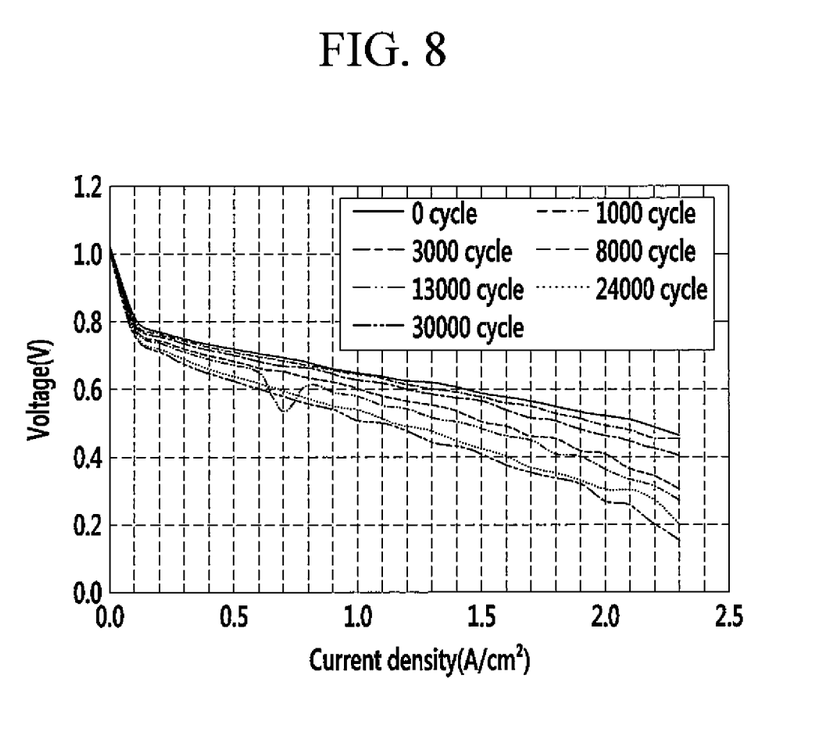
FIG. 8 is a graph showing current density of the catalyst layer for a fuel cell according to Comparative Example 1 as the repeated cycles.
Figure 9:
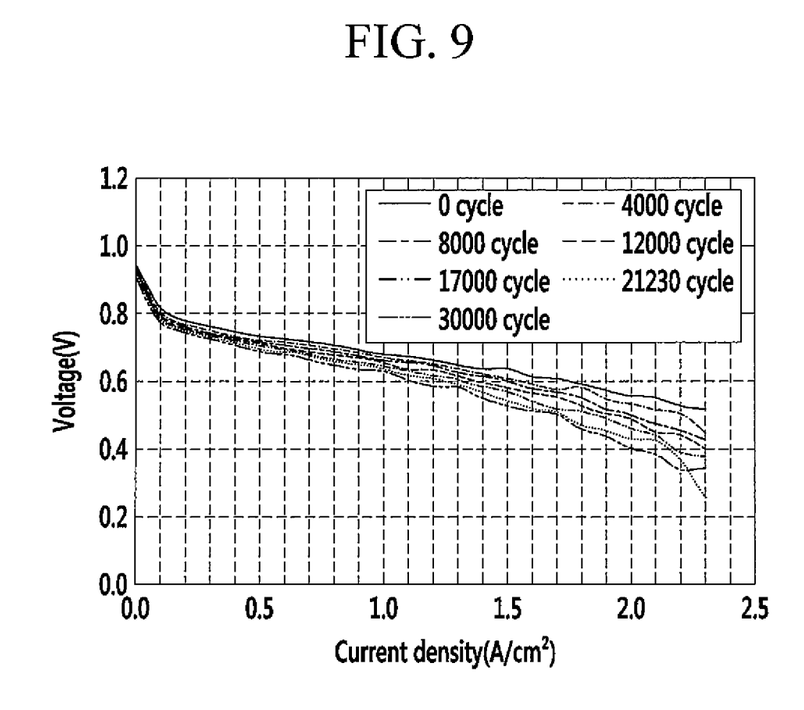
FIG. 9 is a graph showing current density of the catalyst layer for a fuel cell according to Example 2 as the repeated cycles.

The results are provided in FIGS. 8 and 9.

FIG. 8 is a graph showing current density of the catalyst layer for a fuel cell according to Comparative Example 1 as the repeated cycles, and FIG. 9 is a graph showing current density of the catalyst layer for a fuel cell according to Example 2 as the repeated cycles.

Referring to FIGS. 8 and 9, the catalyst layer of Example 2 had a voltage drop of 30 mV at 0.8 A/cm$^2$ at 14,000 cycles, while the catalyst layer of Comparative Example 1 had the same voltage drop at only 5,500 cycles. Accordingly, the catalyst layer for a fuel cell according to one embodiment had excellent durability for corrosion of the supporter.

Evaluation 3: Thickness and Porosity Changes of Catalyst Layer

The membrane-electrode assemblies according to Examples 1 to 5 and Comparative Examples 1 to 4 were cycled by repetitively applying with a voltage of 0.6 V to 1.0 V by providing each cathode with $O_2$ having a relative humidity of 100% and each anode with $H_2$ having a relative humidity of 100%.

The catalyst layers of Examples 1 to 5 and Comparative Examples 1 to 4 were measured regarding thickness and porosity change before the cycles, that is, before the corrosion of the supporters, and after the cycles, that is, after the corrosion of the supporters. The results are provided in the following Table 1.

The thickness of the catalyst layer was measured using the SEM photograph of the cross section of the membrane-electrode assembly, and the porosity of the catalyst layer was measured using a porosimeter.

TABLE 1

| | Thickness of catalyst layer (micron) | | Porosity of catalyst layer (volume %) | |
|---|---|---|---|---|
| | Before cycle operation | After cycle operation | Before cycle operation | After cycle operation |
| Example 1 | 7.0 | 6.7 | 53 | 50 |
| Example 2 | 7.3 | 6.9 | 55 | 53 |
| Example 3 | 7.5 | 7.2 | 58 | 55 |
| Example 4 | 7.3 | 7.0 | 57 | 55 |
| Example 5 | 6.8 | 6.4 | 52 | 48 |
| Comparative Example 1 | 6.3 | 5.5 | 48 | 41 |
| Comparative Example 2 | 8.3 | 6.8 | 65 | 52 |
| Comparative Example 3 | 6.5 | 5.5 | 48 | 41 |
| Comparative Example 4 | 8.1 | 6.3 | 64 | 52 |

Evaluation 4: Power Output Performance of Membrane-Electrode Assembly

The membrane-electrode assemblies according to Examples 1 to 5 and Comparative Examples 1 to 4 were operated with a voltage of 0.4 V to 1.0 V under the following conditions and measured regarding power output density. The results are provided in the following Table 2.

The tests were performed under a condition of a temperature of 65° C., relative humidity of 50%/50%, a gauge pressure of 0 kPa/0 kPa by flowing $H_2$ and air of 9.33 ccm and 188.32 ccm of the respective anode and cathode flow rates until the current was less than 200 mA/cm$^2$, and by flowing $H_2$ and air at a stoichiometry (the amount of hydrogen gas supplied in an anode/the amount of air supplied in a cathode, λ) of 1.5/2.0 after the current was increased to 200 mA/cm$^2$ or more.

TABLE 2

|  | Power output density (mW/cm$^2$) |
| --- | --- |
| Example 1 | 615.7 |
| Example 2 | 608.5 |
| Example 3 | 628.6 |
| Example 4 | 613.7 |
| Example 5 | 605.3 |
| Comparative Example 1 | 578.2 |
| Comparative Example 2 | 539.0 |
| Comparative Example 3 | 581.5 |
| Comparative Example 4 | 535.4 |

Referring to Table 2, the membrane-electrode assemblies according to Examples 1 to 5 had higher power output density than the ones according to Comparative Examples 1 to 4. Accordingly, the membrane-electrode assembly for a fuel cell including the catalyst layer according to one embodiment of the present invention had excellent power output performance.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and equivalents thereof.

What is claimed is:

1. An electrode for a fuel cell, comprising:
   an electrode substrate; and
   a catalyst layer on the electrode substrate,
   wherein the catalyst layer comprises:
      an active metal catalyst; and
      a composite supporter supporting the active metal catalyst and comprising a spherical-shaped supporter comprising at least one selected from graphite, denka black, ketjen black and lamp black, and a fibrous supporter comprising a graphitized carbon nanofiber,
   wherein the fibrous supporter is included in an amount of about 5 wt % to about 40 wt % based on the total amount of the composite supporter,
   the fibrous supporter has a diameter at least twice as large as that of the spherical-shaped supporter, and
   a change in a thickness of the catalyst layer after a cycle operation is 5.88% or less based on the thickness of the catalyst layer before the cycle operation, wherein the cycle operation is conducted by repetitively applying with a voltage of 0.6 V to 1.0 V within the range at 80° C. by providing each cathode with $O_2$ having a relative humidity of 100% and each anode with $H_2$ having a relative humidity of 100% until a voltage drop of 30 mV at 0.8 A/cm$^2$.

2. The electrode for a fuel cell of claim 1, wherein the fibrous supporter is included in an amount of about 5 wt % to about 30 wt % based on the total amount of the composite supporter.

3. The electrode for a fuel cell of claim 1, wherein a ratio of the diameter of the fibrous supporter to that of the spherical-shaped supporter is in a range from about 2 to about 10.

4. The electrode for a fuel cell of claim 1, wherein the composite supporter is included in an amount of about 20 wt % to about 80 wt % based on the total amount of the catalyst.

5. The electrode for a fuel cell of claim 1, wherein the catalyst layer further comprises an ionomer.

6. The electrode for a fuel cell of claim 5, wherein the ionomer is included in an amount of about 15 wt % to about 50 wt % based on the total amount of the catalyst layer.

7. A membrane-electrode assembly for a fuel cell, comprising:
   a cathode;
   an anode facing the cathode; and
   a polymer electrolyte membrane interposed between the cathode and the anode,
   wherein the cathode and the anode comprise the electrode according to claim 1.

8. A fuel cell system, comprising
   a fuel supplier for supplying a mixed fuel comprising fuel and water;
   a reforming part for reforming the mixed fuel and generating a reformed gas comprising hydrogen gas;
   a stack comprising the membrane-electrode assembly according to claim 7 and a separator disposed on either side of the membrane-electrode assembly, the stack being for generating electrical energy through electrochemical reaction of the reformed gas supplied from the reforming part, and an oxidant; and
   an oxidant supplier for supplying the oxidant to the reforming part and the stack.

9. The electrode for a fuel cell of claim 3, wherein the ratio of the diameter of the fibrous supporter to that of the spherical-shaped supporter is in a range from about 5 to about 10.

10. The electrode for a fuel cell of claim 5, further comprising a non-conductive compound utilized along with the ionomer for adherence support.

11. The electrode for a fuel cell of claim 1, wherein the thickness of the catalyst layer is about 6.8 μm to about 7.5 μm before the cycle operation.

12. An electrode for a fuel cell, comprising:
   an electrode substrate; and
   a catalyst layer on the electrode substrate,
   wherein the catalyst layer comprises:
      an active metal catalyst; and
      a composite supporter supporting the active metal catalyst and comprising a spherical-shaped supporter comprising at least one selected from graphite, denka black, ketjen black and lamp black, and a fibrous supporter comprising a graphitized carbon nanofiber,
   wherein the fibrous supporter is included in an amount of about 5 wt % to about 40 wt % based on the total amount of the composite supporter,
   the fibrous supporter has a diameter at least twice as large as that of the spherical-shaped supporter, and
   a change in a thickness of the catalyst layer after a cycle operation is 0.4 μm or less, wherein the cycle operation is conducted by repetitively applying with a voltage of 0.6 V to 1.0 V within the range at 80° C. by providing each cathode with $O_2$ having a relative humidity of 100% and each anode with $H_2$ having a relative humidity of 100% until a voltage drop of 30 mV at 0.8 A/cm$^2$.

* * * * *